US006583902B1

(12) United States Patent
Yuen (10) Patent No.: US 6,583,902 B1
(45) Date of Patent: Jun. 24, 2003

(54) MODULAR FIBER-OPTIC TRANSCEIVER (75) Inventor: Albert T. Yuen, Los Altos, CA (US)

(73) Assignee: Alvesta, Inc., Sunnyvale, CA (US)

( * ) Notice: Subject to any disclaimer, the term of this patent is extended or adjusted under 35 U.S.C. 154(b) by 0 days.

(21) Appl. No.: 09/459,421

(22) Filed: Dec. 9, 1999

(51) Int. Cl.$^7$ .............................................. H04B 10/00
(52) U.S. Cl. ...................................... 359/152; 359/163
(58) Field of Search ................................. 359/152, 153, 359/163; 385/14, 92, 88, 91; 361/728

(56) References Cited

U.S. PATENT DOCUMENTS

| | | | |
|---|---|---|---|
| 4,461,537 A | 7/1984 | Raymer, II et al. ........ 350/96.2 |
| 4,701,829 A | 10/1987 | Bricaud et al. ............. 361/721 |
| 4,706,164 A | 11/1987 | L'Henaff et al. ........... 361/701 |
| 4,767,179 A | 8/1988 | Sampson et al. .......... 350/96.2 |
| 4,878,728 A | 11/1989 | Mannschke ................... 385/14 |
| 4,985,805 A | 1/1991 | Reidel et al. ............... 361/386 |
| 5,047,835 A | * 9/1991 | Chang ........................ 257/433 |
| 5,103,108 A | 4/1992 | Crimmins ................ 250/338.1 |
| 5,117,476 A | 5/1992 | Yingst et al. ................. 385/88 |
| 5,182,780 A | 1/1993 | Robertson .................... 385/14 |
| 5,203,212 A | 4/1993 | Bovendeur et al. ...... 73/863.21 |
| 5,208,889 A | 5/1993 | Cedrone et al. ............. 385/114 |
| 5,241,614 A | 8/1993 | Ecker et al. ................... 385/94 |
| 5,247,595 A | 9/1993 | Földi ............................ 385/78 |
| 5,280,191 A | 1/1994 | Chang ........................ 257/712 |
| 5,375,184 A | 12/1994 | Sullivan ...................... 385/129 |
| 5,420,954 A | 5/1995 | Swirhun et al. .............. 385/92 |
| 5,432,630 A | 7/1995 | Lebby et al. ................ 359/152 |
| 5,473,716 A | 12/1995 | Lebby et al. ................. 385/54 |
| 5,479,288 A | 12/1995 | Ishizuka et al. ............. 359/163 |
| 5,500,911 A | 3/1996 | Roff ............................. 385/33 |
| 5,513,073 A | 4/1996 | Block et al. ................. 361/719 |
| 5,515,467 A | 5/1996 | Webb ........................... 385/88 |
| 5,528,408 A | 6/1996 | McGinley et al. .......... 359/152 |
| 5,535,034 A | 7/1996 | Taniguchi ................... 359/152 |
| 5,535,036 A | 7/1996 | Grant ......................... 359/163 |
| 5,535,297 A | 7/1996 | Goettsche .................... 389/90 |
| 5,539,200 A | 7/1996 | Lebby et al. ........... 250/227.11 |
| 5,574,814 A | 11/1996 | Noddings et al. ............. 385/90 |
| 5,590,232 A | 12/1996 | Wentworth et al. ........... 385/92 |
| 5,611,013 A | 3/1997 | Curizo ......................... 385/89 |
| 5,627,931 A | 5/1997 | Ackley et al. ................ 385/88 |
| 5,631,988 A | 5/1997 | Swirhun et al. .............. 385/89 |
| 5,668,654 A | 9/1997 | Benjamin et al. ........... 359/152 |
| 5,687,267 A | 11/1997 | Uchida ........................ 385/89 |

(List continued on next page.)

Primary Examiner—Leslie Pascal
Assistant Examiner—Christina Y Leung
(74) Attorney, Agent, or Firm—Townsend and Townsend and Crew LLP (57) ABSTRACT

A modular fiber-optic transceiver has an optoelectronic subassembly stack assembled in the beam direction and parallel to the plane of the mounting site. The subassembly is formed in various combinations of individually designed building modules for aligning, focusing, optoelectronic processing and eventual cooling. The subassembly is electrically conductive connected to a transceiver board and kept in perpendicular orientation to it by a snap fitting housing. The housing holds the cable plug of the fiber cable in position and transmits thereby the peripheral imposed mechanical load directly onto the mounting site. The modular building concept supports various techniques for fiber optic data transmission.

18 Claims, 7 Drawing Sheets

U.S. PATENT DOCUMENTS

| | | | | |
|---|---|---|---|---|
| 5,729,644 | A | 3/1998 | Shiflett et al. | 385/59 |
| 5,731,709 | A | 3/1998 | Pastore et al. | 324/760 |
| 5,767,999 | A | 6/1998 | Kayner | 359/163 |
| 5,781,682 | A | 7/1998 | Cohen et al. | 385/89 |
| 5,796,899 | A | 8/1998 | Butrie et al. | 385/92 |
| 5,799,030 | A | 8/1998 | Brenner | 372/50 |
| 5,808,336 | A | 9/1998 | Miyawaki | 257/315 |
| 5,812,571 | A | 9/1998 | Peters | 372/36 |
| 5,812,581 | A | 9/1998 | Cox | 372/50 |
| 5,812,717 | A | 9/1998 | Gilliland | 385/93 |
| 5,815,623 | A | 9/1998 | Gilliland et al. | 385/93 |
| 5,848,214 | A | 12/1998 | Haas et al. | 385/120 |
| 5,864,468 | A | 1/1999 | Poplawski et al. | 361/753 |
| 5,879,173 | A | 3/1999 | Poplwski et al. | 438/138 |
| 5,883,998 | A | 3/1999 | Stevens et al. | 385/134 |
| 5,909,298 | A | 6/1999 | Shimada et al. | 359/163 |
| 5,933,558 | A | 8/1999 | Sauvageau et al. | 385/88 |
| 5,940,564 | A | 8/1999 | Jewell | 385/93 |
| 5,963,681 | A | 10/1999 | Clements | 385/14 |
| 5,978,401 | A | 11/1999 | Morgan | 372/50 |
| 5,994,720 | A | 11/1999 | Snyman et al. | 257/86 |
| 5,995,262 | A | 11/1999 | Hirota et al. | 359/163 |
| 5,999,295 | A | 12/1999 | Vowell et al. | 359/152 |
| 6,024,500 | A | 2/2000 | Wolf | 385/92 |
| 6,028,769 | A | 2/2000 | Zurek | 361/704 |
| 6,033,125 | A | 3/2000 | Stillie et al. | 385/75 |
| 6,034,808 | A | 3/2000 | Isaksson | 359/245 |
| 6,038,048 | A | 3/2000 | Harris et al. | 359/159 |
| 6,071,017 | A | 6/2000 | Gilliland et al. | 385/93 |
| 6,072,613 | A | 6/2000 | Henningsson et al. | 359/152 |
| RE36,820 | E | 8/2000 | McGinley et al. | 361/752 |
| 6,095,697 | A | 8/2000 | Lehman et al. | 385/88 |
| 6,097,521 | A | 8/2000 | Althaus et al. | 359/143 |
| 6,111,271 | A | 8/2000 | Snyman et al. | 257/80 |
| 6,116,791 | A | 9/2000 | Laninga et al. | 385/83 |
| 6,130,979 | A | 10/2000 | Isaksson et al. | 385/89 |
| 6,160,647 | A | 12/2000 | Gilliland et al. | 359/110 |
| 6,201,704 | B1 | 3/2001 | Poplawski et al. | 361/753 |
| 6,203,333 | B1 | 3/2001 | Medina et al. | 439/76.1 |
| 6,206,582 | B1 | 3/2001 | Gilliland | 385/92 |
| 6,213,651 | B1 | 4/2001 | Jiang et al. | 385/92 |

\* cited by examiner

MODULAR FIBER-OPTIC TRANSCEIVER

FIELD OF INVENTION

The present invention relates generally to the packaging of optoelectronic devices within a fiber optic transceiver for telecommunication and data communication applications.

BACKGROUND OF THE INVENTION

The speed of computers and the data transfer between them is ever increasing. Optical data transmission techniques have been developed to provide high capacity signal transmission without many of the physical limitations for electrical cables. Fiber-optic cables have advantageous transmission characteristics, which are utilized with optoelectronic devices such as fiber-optic transceivers (FOT) by converting electrical signals into optical signals and vice versa at the ends of the fiber-optic cables.

The light beams utilized within an optical signal transmission have continuously extending bandwidths, which allow higher data transmission rates in the optical connection. As a result, more optoelectronic and electronic circuitry is necessary within the FOT to process the signal flow.

The typical hardware architecture of computers involves circuit boards that are perpendicularly connected with a pin edge or a pin array in lengthy multi-pin connectors, which are laterally arrayed on a mother board. That way, the circuit boards are oriented parallel with their receptacle end showing towards the back end of the computer. The designated ends have mounting sites that carry the cable connectors. The cable connectors typically reach through open slots in the back face of the computer chassis such that the communication cables can be connected from outside.

The distance between the open slots is standardized in the computer industry, which leaves a predetermined gap between the parallel oriented circuit boards.

The core of a FOT is typically a planar optoelectronic semiconductor (POS) that receives and emits the light beams perpendicular to its top surface. Since the fiber cable is connected normal to the computer back face as other communication cables, the POS must have a first distinct orientation, which is perpendicular oriented to the circuit board.

To focus the light beams, lenses are placed between the end of the fiber cable and the planar semiconductor. They too must be placed according to the first distinct orientation and are therefore preferably united in a subassembly.

The signals converted in the POS have to be processed within the transceiver. A secondary electronic circuitry (SEC) buffers, amplifies and filters signals that are provided to and derived from the POS.

A typical transceiver board of a FOT carries the sub assembly, the SEC and a pin array, which provides the mechanical and electrical connection of the whole FOT to the mounting site of the circuit board, to which it is soldered.

The size of the pin array(s) defines (together with the space demands for the SEC) the physical extension of the transceiver board, which is several times longer than the POS size. The sub-assembly is placed together with the individual components of the SEC on the transceiver board in a second building orientation.

Due to the continuing miniaturization of semiconductor devices the circuitry involved becomes smaller in size. At the same time more conductive traces and leads needs to be provided between and within the POS and the SEC. The higher complexity and density thereby raises the demand for novel packaging designs.

With higher signal transmission rates, the resistance and the capacitance in the conductive traces and leads become more influential and impose a certain latency upon the FOT. Therefore, there exists a need for a packaging that keeps the length of conductive traces and leads to a minimum.

The high circuit density and high signal processing rate in FOT's result in a thermal load. FOT's need to be designed in a way that the circuitry receives sufficient cooling.

The increased signal density and high bandwidth of the light beams become sensitive to attenuation and reflectance in the optical path. This occurs mainly where fiber optics are interrupted or when the beams have to pass through a number of optical elements. Therefore, there exists a need to keep the optical transitions within the FOT to a minimum.

Cable ends are typically held in cable connectors with support panels connected directly to the computer chassis. Excessive mechanical load and torque on the cable ends bear the risk of overcoming the stiffness of these support panels and imposing a deformation onto the FOT. The FOT needs to be designed to withstand a minimal deformation and maintain the alignment of the cable end with the lens system and the POS.

To extend the application of FOT for mass-produced, low-cost computers, the individual components need to be economical to fabricate, and the assembly of the FOT needs to be simple and reliable at the same time.

A number of attempts have been made to integrate the design needs as described above into a feasible packaging.

The most conventional FOT as it is known to those skilled in the art is a duplex transceiver with two pre-fabricated conventional TO-can's that are soldered with bent leads onto the printed transceiver board. The bent leads impose resistance and capacitance onto the system, and reduce with their free lengths the achievable alignment precision.

The support panel has to be mounted on the transceiver board in indirect connection with the TO-cans, which reduces the achievable stiffness. The whole packaging consists mainly of a bulky, one directional assembly on the transceiver board.

U.S. Pat. No. 4,461,537 discloses a fiber optic connector assembly for first generation fiber optics with high signal levels and low bandwidth. The signal conversion is accomplished without secondary circuitry. An optical cable end has a cylindrical plug with shoulders that snap in circularly arranged hooks of a connector housing. A central element of the connector features a circular cavity with the embedded lens, against which the very end of the fiber optic comes to rest. The central element has solder pins for electrical and mechanical connection with a circuit board. The central element has two small interlocking hooks that snap into corresponding slots of the connector housing. The stiffness requirements of the connector housing do not allow sufficiently interlocking noses. The connector housing has therefore additional snap fingers that fit into corresponding holes of the circuit board and secure the assembly.

The reliability of the assembly depends on the accuracy of shape and position of the corresponding holes of the mounting site and create an external quality risk for the fiber-optic connector assembly.

U.S. Pat. No. 4,767,179 discloses an improvement of the patent described above. The fiber optic connector assembly is extended to the application of a duplex transceiver with an independent emitter and receiver station within one housing.

The external quality risk as described above is also resolved by adding a bottom board to the assembly where the snap fingers of the connector housing engage.

U.S. Pat. No. 4,985,805 discloses a device for the cooling of optoelectronic components by the use of a flange joint. The patent discloses a massive constructed device with a multitude of three-dimensional mounted components for heavy duty applications. The constructive afford of the design with its space consuming components do not allow the utilization within regular computers.

U.S. Pat. No. 5,280,191 discloses a packaging for pairs of optical devices having thermal dissipation means. The patent discloses a design of a duplex transceiver with secondary circuitry and a heat sink for cooling.

Two optical subassemblies are placed in a receptacle. The POS is integrated together with the SEC on the transceiver board. As a result, the receiving and emitting light beams must be redirected over 90 degrees between the POS and the optical cable end. This is accomplished by an additional bent fiber optic segment, which results in unfavorable optical attenuation and sensitive assembly procedures.

The heat sink is a sheet metal part, which provides only flat areas with low thermal convection.

U.S. Pat. No. 5,513,073 discloses an optical device heat spreader and thermal isolation apparatus. In this duplex transceiver, the POS are connected to a heat spreader card, which is thermally isolated from the transceiver board. A flexible cable string connects the POS with the SEC.

The heat spreading card is a flat sheet metal piece with low thermal convection in a distant assembly position to the transceiver board. The flexible cable string must cross over an edge of the flat sheet metal piece and bridge the distance to the SEC, which is placed in an inner area of the transceiver board. As a result, the flexible cable string has a significant length with unfavorable resistance and capacitance.

U.S. Pat. Nos. 5,420,954 and 5,631,988 disclose a parallel optical interconnect. The SEC and a multiple POS are monolithically grown on a substrate. Two guiding pins are placed in corresponding holes of the substrate lateral to the multiple POS and align intermediate beam guiding elements and a receptacle correspondingly to the multiple POS. The patents represent a miniaturization design, where mechanical alignment features are placed on the substrate itself. Consequently, the involved mechanical parts like the guiding pins, the intermediate beam guiding elements and the receptacle are relatively small and fragile. The direction of receiving and emitting beams is also perpendicular to the transceiver board.

The substrate is placed on the transceiver board and has wire connections to solder pins protruding from the bottom of the transceiver board. The design provides no cooling features and is therefore only useful for low energetic light beam signaling where the thermal load in the circuitry remains low. This is a further limitation that allows an implementation only for short distance communication.

The intermediate beam guiding element adds an additional optical transition in the signal path that unfavorably attenuates the passing optical signals.

U.S. Pat. No. 5,611,013 discloses an optical miniature capsule for a multi channel transceiver. A multiple POS is directly mounted to a front surface of an adapter block with two lateral aligning holes that receive guiding pins of a corresponding optical cable plug. The adapter block is placed on the transceiver board. The front surface is oriented perpendicular to the transceiver board. Bonding wires connect the multiple POS to conductive leads that are bent over the front edge of an attachment face of the adapter block. The attachment face is soldered together with the embedded lead extensions onto corresponding leads of the transceiver board. The corresponding leads reach close to the SEC in the center of the transceiver board. Secondary wires bridge from the corresponding leads to terminals of the SEC, which is a monolithically grown semiconductor. The assembly formed thereby is encapsulated such that only soldering leads stretch lateral off the apparatus.

The conductive path between the multiple POS and the SEC is relatively long with unfavorable resistance and capacitance. The multiple POS is in an exposed position where it can be easily damaged by the guiding pins.

U.S. Pat. No. 5,574,814 discloses a parallel optical transceiver link for a multi-channel FOT. A transceiver board carries the SEC, which is connected with bonded wires to the multiple POS. The POS is protected by a sapphire window. A box like housing is built in a first assembly direction on top of the transceiver board and holds two perpendicular alignment pins, which define a second assembly direction for the receptacle and a number of POS related fixtures.

As a result, the receptacle is connected to the transceiver board via a number of intermediate housing elements, which reduce the mechanical strength and stiffness of the transceiver link.

Since the wire bonding between SEC and multiple POS needs to be performed at an early stage it is difficult to assemble all the fixtures and housing parts without damaging the wire bonding.

U.S. Pat. No. 5,879,173 discloses a removable transceiver module and receptacle for a duplex transceiver. The patent discloses a number of design variations to encapsulate a generic POS/SEC subassembly. Latch and socket combinations make the transceiver module removable.

The patent does not disclose particular packaging improvements of the POS/SEC subassembly. Thermal loads in the transceiver module are not drained either.

The various techniques for optical data transmission make it difficult for a manufacturer to develop efficient fabrication techniques for all of them. For instance time division multiplexing, wavelength division multiplexing, single channel transmission, duplex transmission or multi-channel transmission require separate component designs to adjust to the differing needs for focusing, optoelectronic processing, secondary signal processing and eventual cooling. In addition, the transceiver boards need to provide differing processing operations, which are not necessary related to the utilized optical data transmission technique. As a result, a number of transceiver boards performing different processing operations must be interchangeably compatible with a number of varyingly designed POS components.

Therefore, there exists a need for a simple modular building design for interchangeable components of a optical transceiver.

With increasing processing capacity the optoelectronic circuitry becomes more sensitive to electromagnetic fields imposed by adjacent circuitry. For purposes of miniaturization it is at the same time desirable to have independently operating optoelectronic circuitry in close proximity. Therefore, there exists a need to incorporate magnet shields between adjacent optoelectronic circuitry within a transceiver assembly.

OBJECTS AND ADVANTAGES

Accordingly, it is a primary object of the present invention to provide a modular building design for a fiber-optic transceiver that is simple and cost effective to fabricate.

It is a further object of the present invention to provide a modular building design for a fiber-optic transceiver that can be utilized for either a duplex or a multi-channel transceiver.

It is a further object of the present invention to provide a modular building design for a fiber optic transceiver that can incorporate faraday shield modules to electromagnetically insulate processing circuitry.

SUMMARY OF THE INVENTION

The current invention discloses a modular building design for optical duplex or multi-channel transceivers. The modular building concept includes mainly of three elements: first, a subassembly stack assembled in a first assembly direction; second, a transceiver board being electrically connected to the subassembly; and third a housing providing mechanical support for the electrical connection of the subassembly to the transceiver board and for a cable plug of a connected fiber cable.

The subassembly includes out of interchangeable building modules that allow different configurations with a minimum of fabrication effort. The building modules that require precise alignment to perform their dedicated function are designed with corresponding alignment features such that they can be aligned to each other and stacked in a direction of the traveling beam signals. The stacking direction defines a first assembly orientation.

The modules perform specialized functions such as precision alignment of the cable plug, focusing the light beams, converting beam signals that are received in various numbers of signal strings into electrical signals and vice versa. An optional cooling module drains heat created during the optoelectronic processing.

The individual modules are preferably held together by an encapsulating housing.

The transceiver board is a printed circuit board that carries various integrated circuits (IC) and connects them via conductive leads to perform designated logical operations. The transceiver board is an intermediate link between the optical processing modules and the main board upon which the optical transceiver is mounted on. Two physically differing designs of transceiver boards are available. The first design has laterally extended soldering pins that form a single solder pin array on the main board. The transceiver board is thereby positioned in perpendicular orientation to the main data communication board. This first design concept is preferably used in combination with low capacity optical processing modules such as optical duplex transceivers. The subassembly is preferably solder bonded with the transceiver board.

A second design has at least two solder pin arrays with the solder pins extending perpendicularly from the transceiver board. The two solder pin arrays provide a high number of electrical contacts and are sufficiently separated to define a two dimensional physical connection with the main board. The transceiver board is in parallel orientation to the main data communication board and has on the end of the optical cable a flexible cable band attached. This flexible cable band provides a high number of electrical connections to the subassembly. The second design is used in combination with high capacity optical processing modules such as optical multi-channel transceivers.

There are two main embodiments for the invention. The first housing design has a closed box structure with an opening on the side of the optical cable that forms the receptacle. The transceiver board forms together with the subassembly a rigid core unit and is preferably held inside the housing by snap fingers.

In the final assembly of the optical transceiver the single solder pin array extends into the middle of the bottom face of the housing. Two additional solder pins on each front corner of the bottom face are anchored in the housing and form together with the single solder pin array a two dimensional mechanical connection with the main data communication board. The perpendicular orientation of the transceiver board allows the first housing design to be narrow so that a relatively high number of them can be placed on the edge of the main data communication board.

The second housing design has a stepped shape with a high front half and a shallow back half. The step between the high front ceiling and the shallow back ceiling has a second opening where the heat sink module reaches through so that it is accessible for a cooling air stream. The transceiver board is embedded parallel to the bottom face of the housing with two solder pin arrays reaching there through.

The flexible subassembly is held independently against internal shoulders of the housing with snap fingers, which oppose the flex bias of the cable band. In both housing designs the opening of the housing has an articulated contour that corresponds to that of a cable plug and provides mechanical support for the optical cable connection.

The housing is composed of a plastic material and is preferably molded. The first and second housing designs have simple and very similar shapes that can be economically fabricated. The interlocking of the housing directly with the cable plug and its direct connection with the main data communication board releases the subassembly and the transceiver board from any mechanical loads peripherally imposed via the fiber cable.

The stacking direction of the subassembly corresponds with the fabrication directions of the building modules, which allows simple and economic fabrication.

The interchangeable modular device of the invention can optionally incorporate a faraday module preferably made of copper material. The faraday module provides enclosed cavities in corresponding shape and position to the individual optoelectronic circuitry of a multi-channel transceiver, which rises above the main plain of the optoelectronic module.

DETAILED DESCRIPTION

Figure 1:
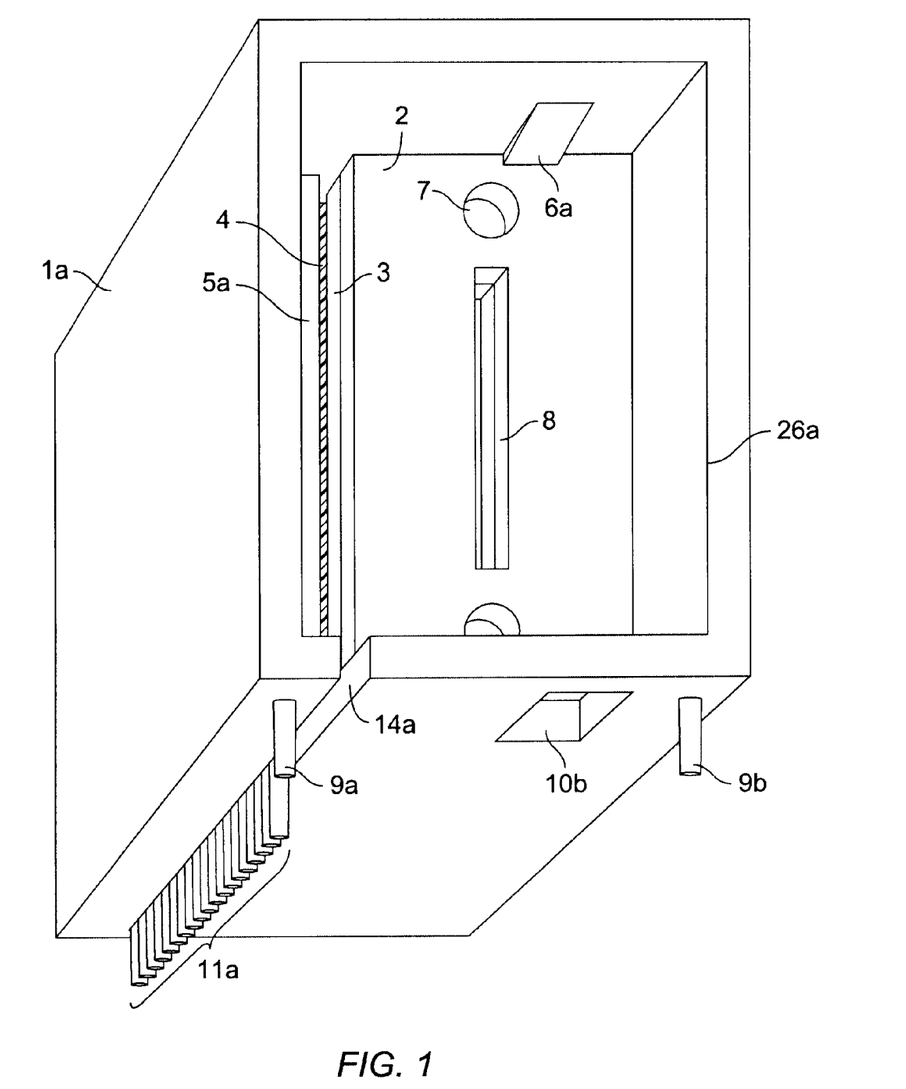
FIG. 1 shows a first perspective view onto the cable adapter side of an exemplary first assembly configuration.

FIG. 1 shows a perspective view of a first assembly configuration with a first subassembly 27a (see FIGS. 2 and 3) being connected to the first transceiver board 5a along a perpendicular direction. The first subassembly 27a comprises typically the adapter module 2, the lens module 3 and the duplex transceiver module 4. The adapter module 2 has precision alignment features 7 that are preferably cylindrical cavities symmetrical and placed in parallel to the beam tunnel 8. The alignment features 7 capture corresponding alignment features of a cable plug (not shown) that is connected to the device during its operation thereby to ensure the precise alignment of the optical fiber end(s) when positioned in front of the beam tunnel 8.

The first transceiver board 5a which in combination with the connected first subassembly 27a define a rigid core unit 28 (see FIG. 3), is placed inside the first housing 1a through the first receptacle contour 26a. First and second snapping features 6a and 6b (see FIG. 2) secure the rigid core unit 28 in the assembled position.

The first and second snapping features 6a, 6b are typically conventional snap hooks that are released from the surrounding housing structure by the housing separations 10b.

Figure 4:
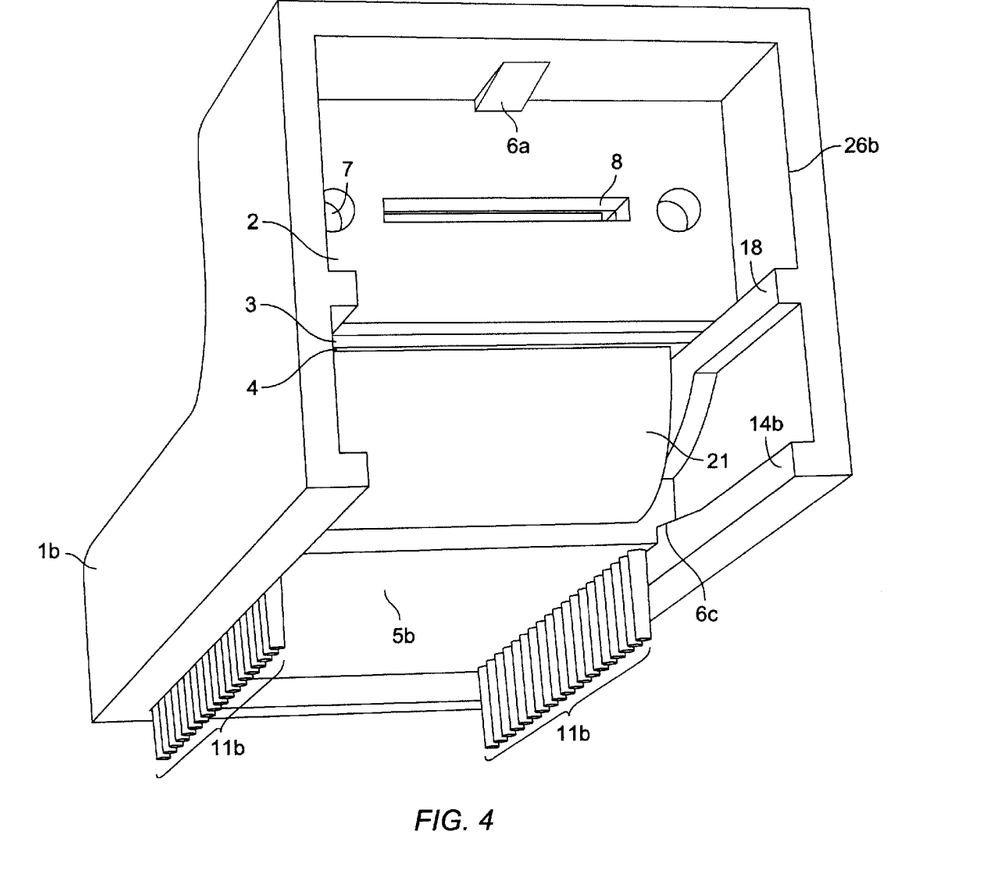
FIG. 4 shows a first perspective view onto the cable adapter side of an exemplary second assembly configuration.

The first and second subassembly 27a and 27b (see FIGS. 5 and 7) are preferably stacked together in an aligned and loose formation and held together respectively inside the first and second housing 1a and 1b (see FIG. 4 and FIG. 5) by the first snapping features 6a, 6b and 6c (see FIG. 4).

A first conventional solder pin array 11a extends laterally from the bottom edge of the first transceiver board 5a and through a first solder pin slot 14a of the first housing 1a.

The first housing 1a features also supporting solder pins 9a, 9b, which define together with the first solder pin array 11a a two dimensional connection. As a result, the first housing 1a is directly mechanically supported at the mounting site of the transceiver device.

Hence, bending loads imposed from the fiber cable are captured by the first receptacle contour 26a such that the subassembly and the rigid core unit 28 remain free of mechanical stress.

The rigid core unit 28 has preferably an outside contour smaller than or equal to the receptacle contour 26a. The rigid core unit 28 is preferably assembled through the receptacle contour 26a inside the first housing 1a.

The first solder pin slot 14a is open on the side of the receptacle contour 26a so as to enable the first solder pin array 11a to slide during the assembly process into its final position.

The first snapping feature 6a is preferably in opposing position to the second snapping feature 6b (see FIG. 2), which is not visible because of the perspective view in FIG. 1. The second feature 6b is at a corresponding location of the housing separation 10. The first snapping feature 6a has also a corresponding housing separation 10 (see FIG. 6).

It is appreciated, that the bottom side of the first and second housing 1a and 1b (see FIGS. 4, 5 and 6) may be a separate part, which allows an assembly of the respective rigid and flexible core units 28 and 29 (see FIG. 7) through the bottom of the respective first and second housing 1a and 1b.

Because of the vertical position of the first transceiver board 5a inside the first housing 1a, the first assembly configuration allows a narrow width of the first housing 1a. Hence, typical mounting sites for first assembly configurations consume little length along the edge of a printed circuit board.

Figure 2:
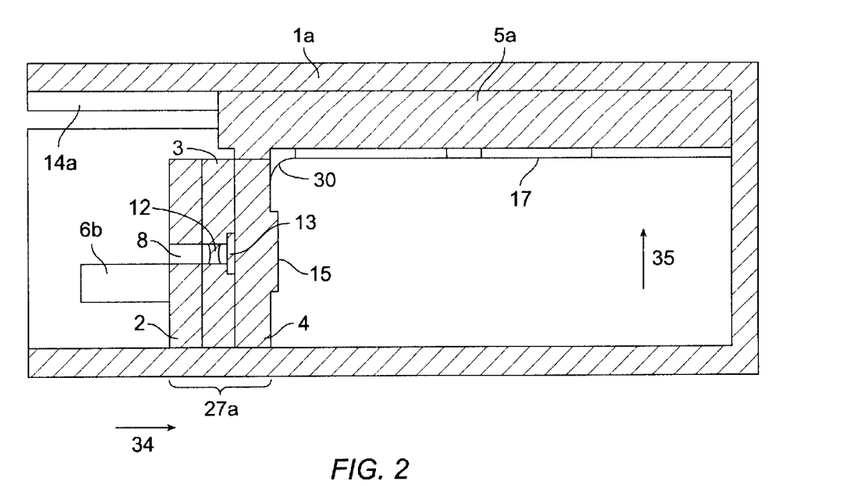
FIG. 2 shows a sectional top view of an exemplary first assembly configuration.

FIG. 2 shows a sectional top view of an exemplary first assembly configuration. The first subassembly is shown with the duplex transceiver module 4 being connected to the first transceiver board 5a.

The duplex transceiver module 4 has an optoelectronic circuitry 13 on its front side and an optional heat dissipation back side 15.

The lens module 3 carries the conventional lenses 12.

A first internal shoulder contour 30a supports the rigid core unit 28.

Figure 3:
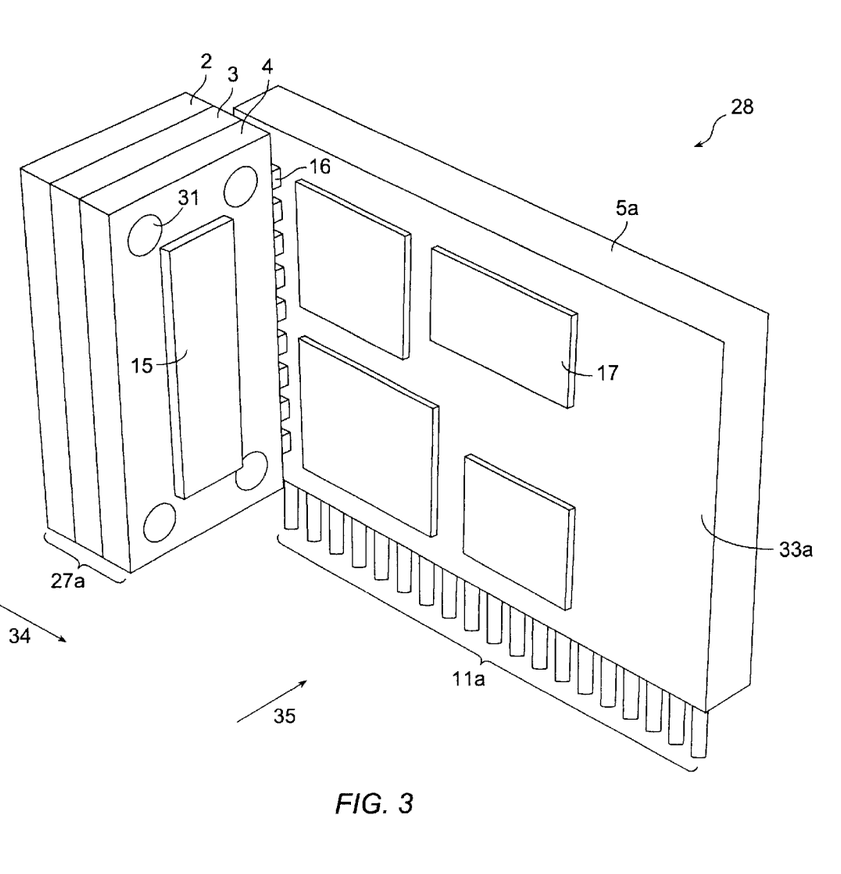
FIG. 3 shows a second perspective view of an exemplary rigid core unit according to the first assembly configuration.

FIG. 3 shows a second perspective view of an exemplary rigid core unit 28 according to the first assembly configuration. The first transceiver board 5a has conventional contact terminals 16 where the duplex transceiver module 4 is preferably solder bonded to provide simultaneously a mechanical connection and a number of electrical connections.

On the back side of the duplex transceiver module 4 are the alignment features 31, shown in FIG. 3, which have a corresponding shape on the front side. The alignment features 31 are placed preferably in identical shape and position on the lens module 3, the multi-channel module 19 (see FIG. 5 and 7), the adapter module 2 and the heat sink module 22 (see FIGS. 5, 6 and 7) such that they can be assembled in different combinations.

The adapter module 2 has the alignment feature 31 only on the back side, since it is placed at the very front of the first and second subassembly 27a, 27b. The heat sink module 22 has the alignment feature 31 only on the front side, since it is placed at the very back of the second subassembly 27b. The uniform shape and position of the alignment features 31 allow a number of functional configurations and designs of each individual module and a free combination between them. As a result, transceiver devices of the invention can be manufactured in a wide variety out of a low number of varying components.

It is appreciated, that the alignment features 31 may incorporate additional functional elements like alignment profiles that protrude through all individual modules.

The first and second transceiver boards 5a and 5b (see FIGS. 5 and 7) have conventional chips 17, which are connected to the contact terminals 16 and the first and second pin arrays 11a and 11b (see FIGS. 4 and 7) to perform standard logical operations.

FIG. 4 shows a first perspective view onto the cable adapter side of an exemplary second assembly configuration.

A flexible core unit 29 (see FIG. 7) is preferably assembled through the second receptacle contour 26b inside the second housing 1b and along the subassembly alignment features 18 and the second solder pin slot 14b. The flexible core unit 29 is held in place by the first and third snapping features 6a, and 6c.

The second subassembly 27b is electrically connected to the second transceiver board 5b via a standard flex cable band 21.

A second solder pin array 11b protrudes perpendicular out of the second transceiver board 5b and forms a two dimensional mechanical and electrical connection at the mounting site.

It is appreciated that the second housing 1b may have supporting solder pins 9a and 9b.

The subassembly alignment feature 18 provides additional support for the second subassembly 27b to compensate the flexibility between it and the second transceiver board 5b.

Figure 5:
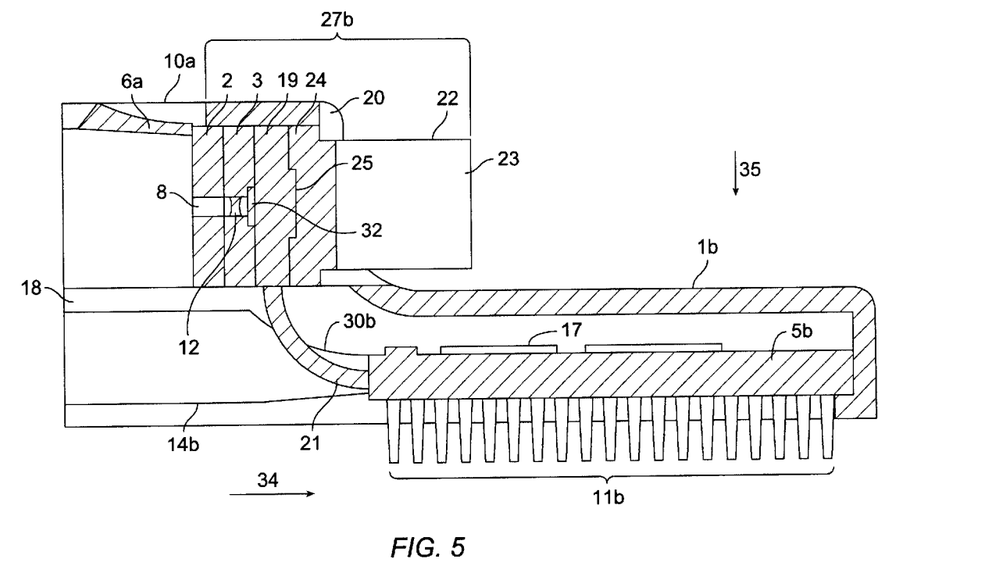
FIG. 5 shows a sectional top view of an exemplary second assembly configuration.

FIG. 5 shows a sectional top view of an exemplary second assembly configuration.

The second subassembly 27b has a multi-channel module 19 with conventional multiple optoelectronic devices 32 disposed thereon. The lens module 3 with its lenses 12 and the adapter module 2 with its beam tunnel 8 are configured correspondingly.

The high density of the multiple optoelectronic devices 32 typically generates excessive heat, which is transmitted via the heat exchange area 25 to the adjacent heat sink module 22. The heat sink module 22 has a heat sink base 24 that contacts the heat exchange area 25 to drain the heat there from and to transmit it to the cooling ribs 23. The second housing 1b has a stepped shape and an opening 20 such that the cooling ribs 23 are accessible for a cooling air stream.

The flex cable band 21 provides a high lead density to transmit the signals of each of the multi-channel module 19 onto the second transceiver board 5b. In addition, it mechanically de-couples the second subassembly 27b from the second transceiver board 5b. Hence, forces applied for instance during the connecting of a fiber cable or during the assembly of the flexible core unit 29 cannot stress or harm the connection between the multi-channel module 19 and the second transceiver board 5b.

It is appreciated that the flex cable band 21 may be used to connect the duplex transceiver module 4 to the first transceiver board 5a in a flexible connection.

It is appreciated that the second transceiver board 5b may have a first solder pin array 11a laterally extended. Hence, the invention in its second assembly configuration may be attached at the mounting site with the second transceiver board 5b in perpendicular position to the mounting site.

Figure 6:
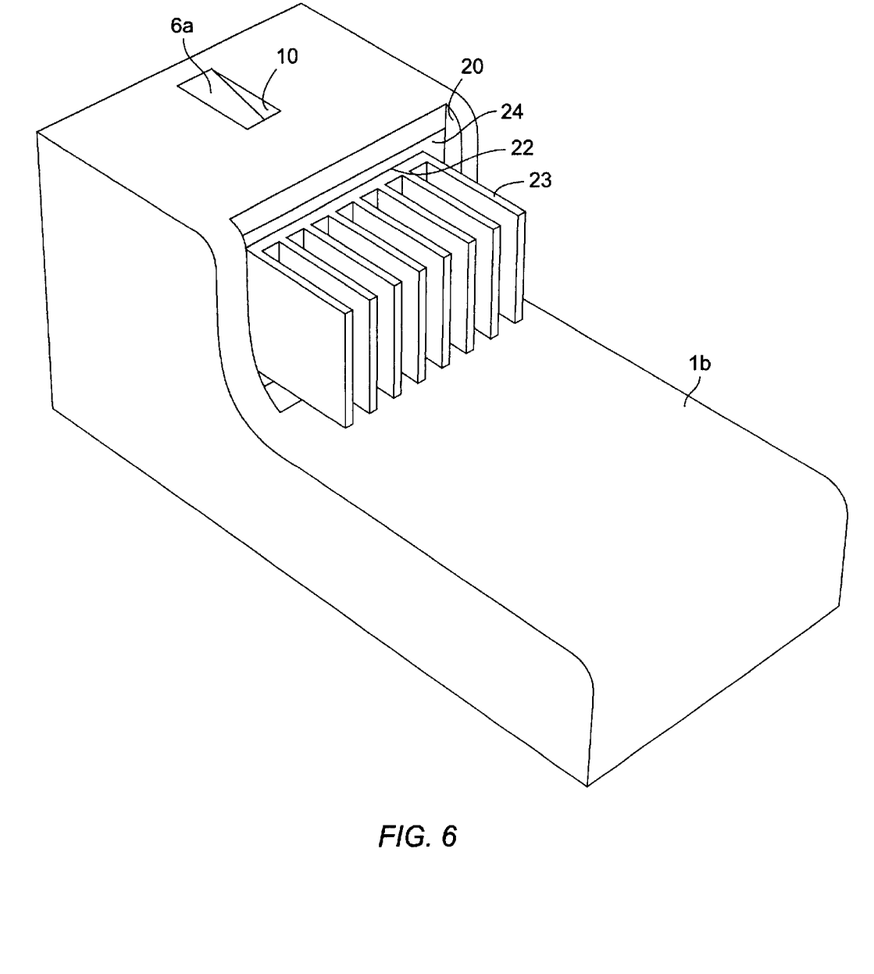
FIG. 6 shows a second perspective view of an exemplary second assembly configuration.

FIG. 6 shows a second perspective view of an exemplary second assembly configuration. The heat sink module 22 is reaching with its cooing ribs 23 through the opening 20 and is accessible for a cooling air stream.

It is appreciated that the first subassembly 27a may have a heat sink module 22 and that the first housing 1a may have a step structure and an opening 20. Hence, the cooling ribs 22 may be accessible for a cooling air stream to dissipate heat from the duplex transceiver module 4.

The modular building technique can be adapted to specific needs related to the optical transmission application. The rigid core unit 28 is preferably utilized for high frequency signal processing where the demands for low processing latency is the primary design requirement. The flexible core unit 29 allows lower assembly precision and lower handling care and is preferably utilized for a low cost variation of an optical transceiver.

First and second subassemblies 27a,b have a first assembly direction 34, which is parallel to the receiving light beam. As a result, the individual modules are simple and easy to manufacture with a high precision.

Figure 7:
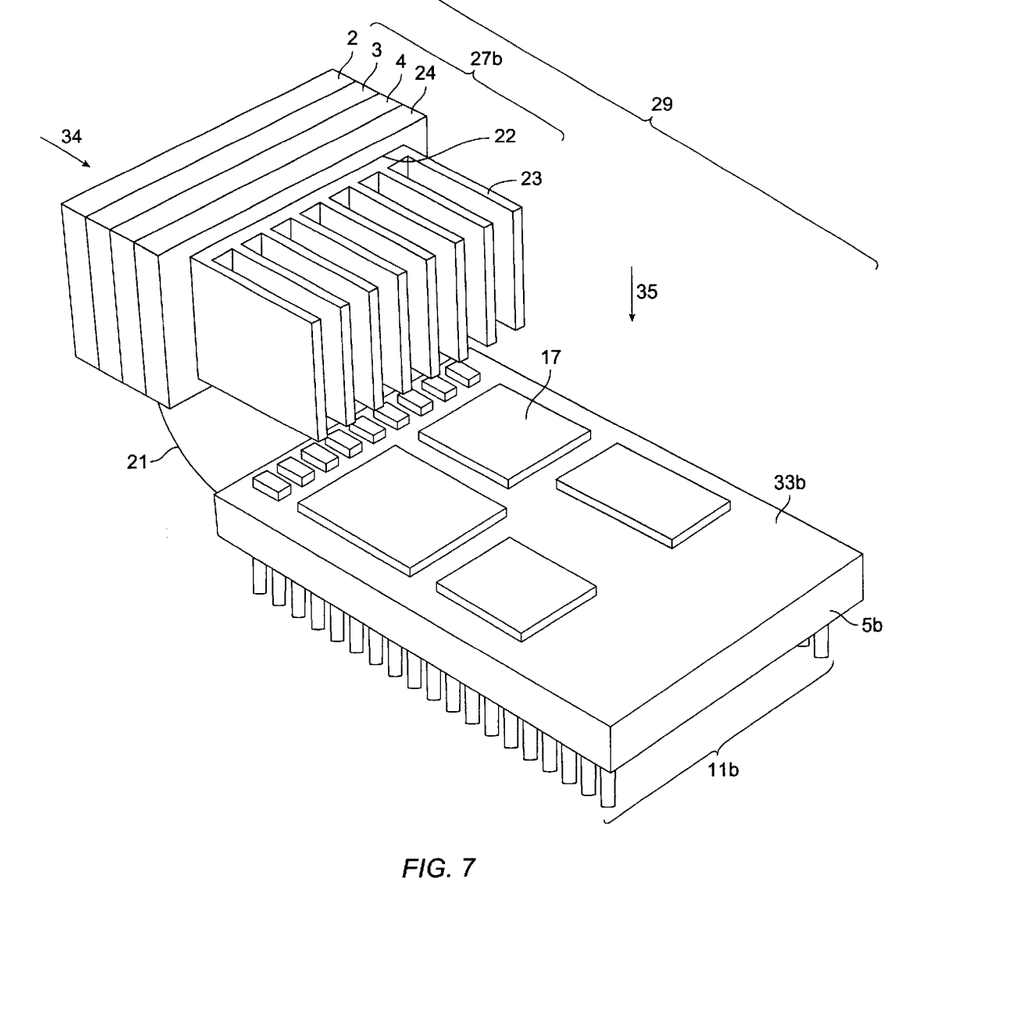
FIG. 7 shows a second perspective view of an exemplary flexible core unit according to the second assembly configuration.

The transceiver boards 5a, 5b—respectively shown in FIGS. 3 and 7—have mainly one second assembly direction 35, which is perpendicular to their respective printed top surfaces 33a, 33b. The chips 17, contact terminals 16, leads (not shown), and other conventional elements of circuit boards are preferably manufactured in the second assembly direction 35.

Thus, the rigid and the flexible core units 28, 29 are mainly fabricated in first and second assembly direction 34, 35, which allow a simple fabrication. The simple fabrication can be adjusted with low effort to the different variations of the invention.

Figure 8:
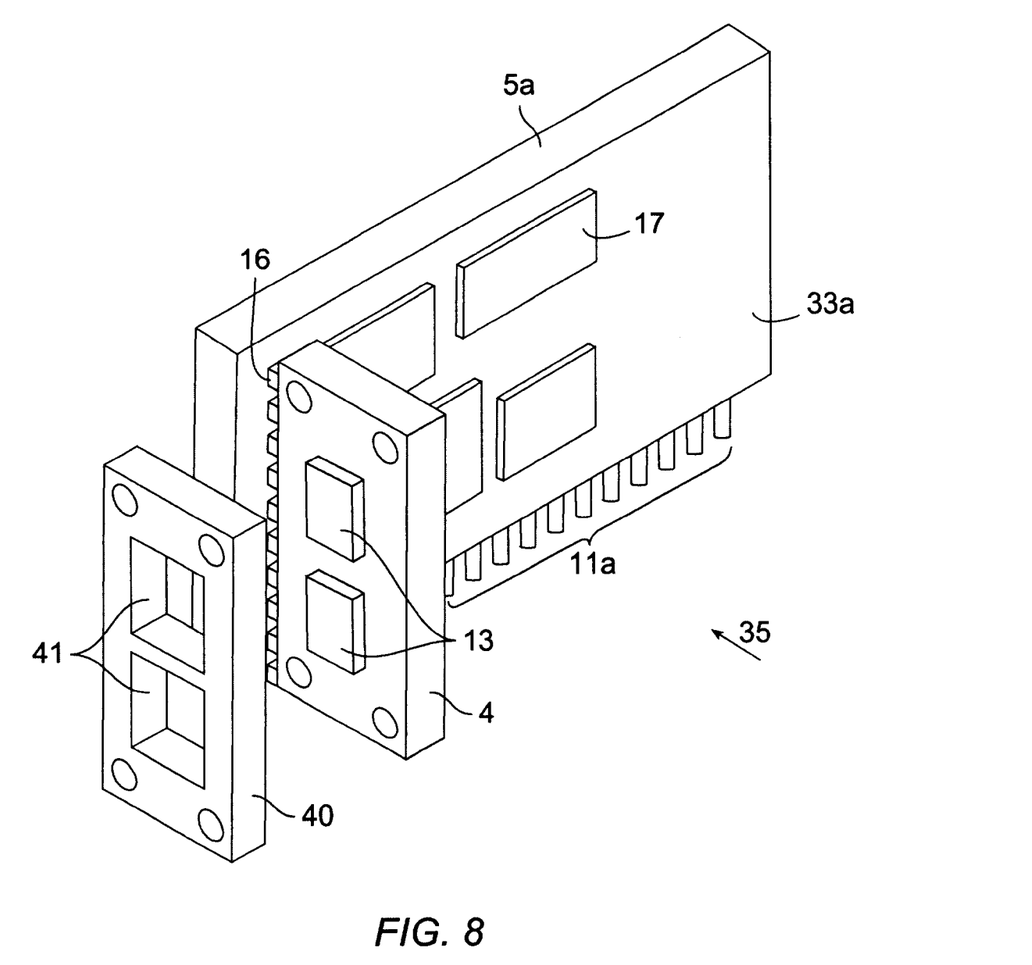
FIG. 8 shows a perspective view of a transceiver module containing optoelectronic devices on its front side, and a faraday shield module containing cavities, in accordance with the exemplary first assembly configuration of FIG. 1.

The interchangeable modular devices of the invention can optionally incorporate a faraday module 40 preferably made of copper material. The faraday module 40 provides enclosed cavities 41 in corresponding shape and position to the optoelectronic circuitry 13 that protrude from the transceiver module 4.

It is appreciated that the first and second subassemblies 27a,b may have additional functional modules providing a conventional feature and/or performing a conventional function.

Accordingly, the scope of the invention should be determined by the following claims and their legal equivalents:

What is claimed is:

1. A fiber optic transceiver for transforming communication signals between an optical cable end and a connector array, said optical cable carrying an optical beam having a beam direction, the fiber optic transceiver comprising:

first and second functional modules forming a stack assembly having an assembly direction parallel to said beam direction; and a processing board coupled to the stack assembly in a coupling direction that is perpendicular to the optical beam direction, wherein said first functional module includes a plurality of optoelectronic devices, and wherein said second functional module is a faraday shield module with at least one cavity enclosing the plurality of the optoelectronic devices of the first functional module.

2. The fiber optic transceiver of claim 1 wherein the stack assembly further comprises a heat sink.

3. The fiber optic transceiver of claim 2 further comprising a housing for housing the processing board and the stack assembly.

4. The fiber optic transceiver of claim 3 wherein said housing further comprises an opening for transferring heat away from the heat sink.

5. The fiber optic transceiver of claim 1 wherein the stack assembly is coupled to the processing board via a flexible cable.

6. The fiber optic transceiver of claim 1 wherein the stack assembly is coupled to the processing board via a solder bond.

7. The fiber optic transceiver of claim 1 wherein the stack assembly comprises an alignment feature.

8. The fiber optic transceiver of claim 7 wherein the alignment feature comprises a cylindrical cavity formed in the stack assembly in parallel direction to the optical beam direction.

9. The fiber optic transceiver of claim 1, wherein said processing board comprises at least an array of electrical contacts extending laterally therefrom.

10. A method of transforming communication signals between an optical cable carrying an optical beam having a beam direction and a connector array, the method comprising:

forming a stack assembly comprising first and second functional modules wherein said stack assembly has an assembly direction that is parallel to the optical beam direction; and coupling a processing board to the stack assembly in a coupling direction that is perpendicular to the optical beam direction, wherein said first functional module includes a plurality of optoelectronic devices, and wherein said second functional module is a faraday shield module with at least one cavity enclosing the plurality of the optoelectronic devices of the first functional module.

11. The method of claim 10 further comprising:
coupling a heat sink to the stack assembly.

12. The method of claim 11 further comprising:
disposing the stack assembly and the processing board in a housing.

13. The method of claim 12 further comprising:
forming an opening in the housing to transfer heat away from said heat sink.

14. The method of claim 10 further comprising:
coupling the processing board to the stack assembly via a flexible cable.

15. The method of claim 10 further comprising:
coupling the processing board to the stack assembly via a solder bond.

16. The method of claim 10 further comprising:
forming an alignment feature on said stack assembly.

17. The method of claim 16 wherein the alignment feature comprises a cylindrical cavity formed in the stack assembly in parallel direction to the optical beam direction.

18. The method of claim 17 further comprising:
forming at least an array of electrical contacts extending laterally from said processing board.

* * * * *